July 30, 1929.  H. B. LUSE  1,722,849

FRUIT DISPENSING DEVICE

Filed Sept. 3, 1927

Inventor.
HARRY B LUSE
Victor J. Evans
By
Attorney

Patented July 30, 1929.

1,722,849

UNITED STATES PATENT OFFICE.

HARRY B. LUSE, OF LYNWOOD, CALIFORNIA.

FRUIT-DISPENSING DEVICE.

Application filed September 3, 1927. Serial No. 217,387.

This invention relates to improvements in fruit dispensing devices and has particular reference to a rotatable globular fruit dispending apparatus.

The principal object of this invention is to provide a novel type of fruit dispenser that will serve to permit a quantity of globular fruit articles such as oranges, apples, lemons or grapefruit to be stored in the container and further equipped with means for rotating the container so that the fruit can be conveniently dispensed.

An additional object of the invention is to provide a dispensing apparatus of the character described, which is economical to manufacture, positive in operation, strong and durable and highly efficient in use.

Other objects and advantages will be apparent during the course of the following description.

Figure 1:
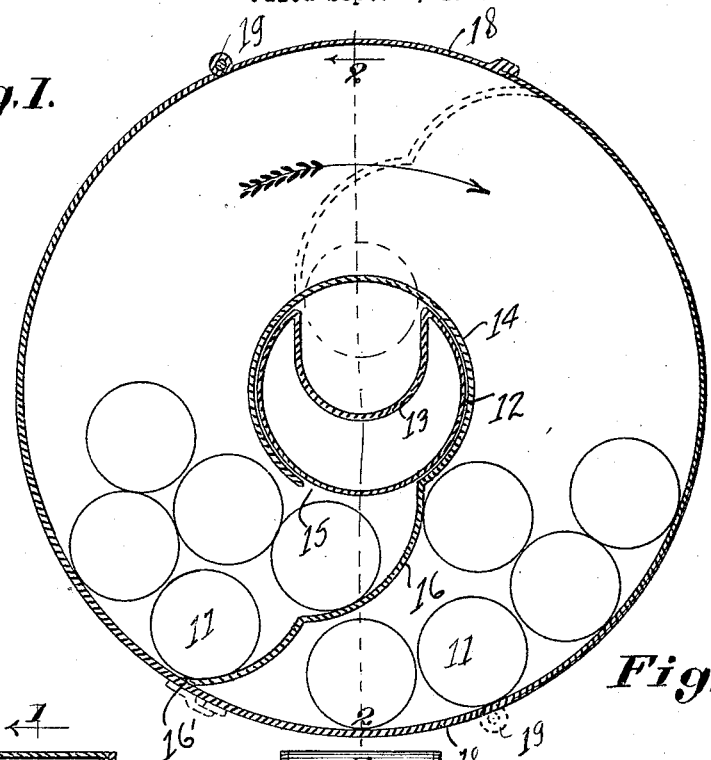
Figure 4:
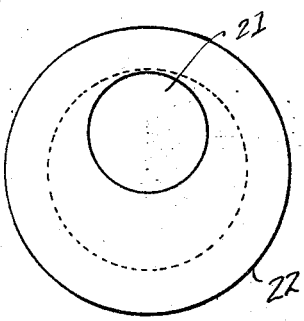
Figure 2:
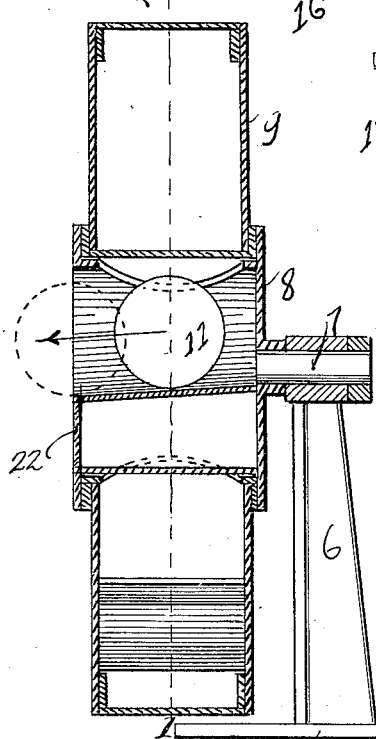
Figure 3:
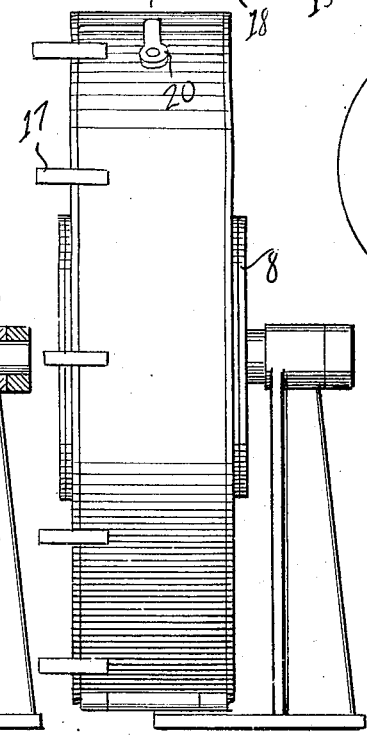

In the accompanying drawings forming a part of this specification and in which like numerals are employed to designate like parts throughout the same, Figure 1 designates a vertical section through the apparatus, the view being taken on the line 1—1 of Figure 2, Figure 2 is a cross section through the device on the line 1—1 of Figure 1, Figure 3 is a side elevation of the dispensing device, and Figure 4 is an elevation of a portion of the device showing the outlet for the fruit through which the same are dispensed.

For the dispensing of globular fruit such as oranges, apples and grapefruit, it is highly convenient to have an apparatus either for the use of a peddler or for home use in which the globular fruit may be stored and readily dispensed one at a time.

In the present invention I have endeavored to produce such an apparatus, and by referring to the drawings, the numeral 5 designates a base having a standard 6 secured thereto, to the upper portion of which is journaled a stub shaft 7 which has mounted thereon a back plate 8. Secured to this back plate 8 is a rotatable drum or receptacle 9 which holds therein a number of grapefruit, oranges or similar globular fruit, as indicated by the numeral 11.

I have secured to the back plate 8 against rotation, a hollow cylindrical member 12 which has formed therein a depression 13 which provides a runway for the fruit which are received thereon. while surrounding the member 12 is an outer cylindrical drum 14 provided with an opening or cutaway portion 15 and an extension 16 which is connected to the inner periphery of the drum 9 as at 16'. It will be noted that the cylindrical member 14 moves as a unit with the drum 9 upon rotation of the same through the medium of the handles 17, which rotary movement causes one of the fruit 11 to be emptied into the runway 13 when the extension 16 assumes the dotted line position, from its full line position and the opening 15 registers with the opening in the runway 13 which are both illustrated to advantage in Figure 1.

Referring to Figure 1, the numeral 18 designates a door which is hinged as at 19 to a portion of the drum and serves as an outlet or inlet for the fruit. When desired a conventional clasp as illustrated at 20 is employed which serves to prevent an opening of the door during the manual rotating action of the apparatus.

When my device is in use a quantity of fruit is placed in the drum through the door 18 after which the door is locked. When it is desired to dispense fruit it is only necessary to rotate the drum by means of the handles 17 and in a clockwise direction. This action will cause the fruit lying against the curved member 16 to pass over the top of the movable member 12 at which time the opening in the movable member will be opposite the depression 13. The reason that the fruit has to pass over the top as above described is that the curved member 16 moves with the drum and by viewing Figure 1 it will be noted that in dotted lines I have shown the position of this curved plate when at the top of its movements. Due to the double curve it is possible for only one orange or apple as the case may be to pass through the opening. The fruit which is lying upon the top of the one dropping through will have passed dead center and therefore gravity will move it toward the bottom of the drum and away from the opening.

From the foregoing description considered in connection with the accompanying drawings, it will be evident that I have devised an economically constructed fruit dispensing apparatus which will serve to quickly and readily dispense the fruit one at a time and at the same time serve as a storage place for fruit that can be used in the household or by a peddler.

It is to be understood that the form of my invention herewith shown and described is to be taken as a preferred example of the same and that various changes relative to the material, size, shape and arrangements of the parts may be resorted to without departing from the spirit of the invention or the scope of the subjoined claim.

Having thus described my invention, I claim:—

In a fruit dispensing device, a standard, a shaft carried in said standard, a cylindrical element fixedly mounted on said standard and having a depression formed therein, a movable cylindrical member rotatably carried on said first mentioned cylindrical member and having an opening formed therethrough, a fruit retaining drum secured to said movable cylindrical element, a curved member extending between said movable member and the inner periphery of said drum, said curved member being so positioned as to prevent more than one fruit passing through the opening in said movable member in the manner described.

In testimony whereof I affix my signature.

HARRY B. LUSE.